(12) United States Patent
Ray et al.

(10) Patent No.: US 6,188,357 B1
(45) Date of Patent: Feb. 13, 2001

(54) SYSTEM AND METHOD FOR MITIGATING STATIC CARRIER-PHASE MULTIPATH EFFECTS

(75) Inventors: Jayanta K. Ray; M. Elizabeth Cannon; Patrick C. Fenton, all of Calgary (CA)

(73) Assignee: NovAtel Inc., Calgary (CA)

( * ) Notice: Under 35 U.S.C. 154(b), the term of this patent shall be extended for 0 days.

(21) Appl. No.: 09/390,620

(22) Filed: Sep. 3, 1999

Related U.S. Application Data (60) Provisional application No. 60/100,747, filed on Sep. 17, 1998.

(51) Int. Cl.[7] .................................................. G01S 3/02
(52) U.S. Cl. .......................... 342/465; 342/453; 342/378
(58) Field of Search ................................ 342/453, 378, 342/465, 357.06

(56) References Cited

U.S. PATENT DOCUMENTS

| | | | |
|---|---|---|---|
| 3,973,262 | 8/1976 | Bohm | 343/113 R |
| 5,119,103 | * 6/1992 | Evans et al. | 342/423 |
| 5,185,610 | * 2/1993 | Ward et al. . | |
| 5,203,027 | 4/1993 | Nounin et al. | 455/134 |
| 5,218,359 | 6/1993 | Minamisono | 342/383 |
| 5,317,595 | 5/1994 | Ostman | 375/14 |
| 5,493,588 | 2/1996 | Lennen | 375/343 |
| 5,543,803 | 8/1996 | Serfling et al. | 342/357 |
| 5,630,208 | 5/1997 | Enge et al. | 455/65 |
| 5,726,659 | 3/1998 | Kee et al. | 342/352 |
| 5,787,131 | 7/1998 | Bottomley | 375/347 |

FOREIGN PATENT DOCUMENTS

| | | |
|---|---|---|
| 0859513A2 | 8/1998 | (EP) . |
| WO98/29755 | 9/1998 | (WO) . |

OTHER PUBLICATIONS

Moelker, "Adaptive Antenna Arrays for Interference Cancellation in GPS and Glonass Receivers," Proceedings of the 1996 IEEE Position Location and Navigation, Plans, 22–26 Apr. 1996, pp. 191–198.

* cited by examiner

Primary Examiner—Theodore M. Blum
(74) Attorney, Agent, or Firm—Cesari and McKenna, LLP (57) ABSTRACT

An antenna array includes a reference antenna and a plurality of closely-spaced secondary antennas for mitigating the effects of multipath signals on a direct signal, each antenna connected to a corresponding receiver which outputs signal data. A computational device uses the post-correlation signal data to estimate the parameters of a virtual reflector and derive correction values for code data, signal noise, and carrier phase.

19 Claims, 5 Drawing Sheets

SYSTEM AND METHOD FOR MITIGATING STATIC CARRIER-PHASE MULTIPATH EFFECTS

CROSS REFERENCE TO RELATED APPLICATION

The present Application is related to Provisional Application Ser. No. 60/100,747 entitled "Mitigation of static carrier phase multipath effects using multiple closely-spaced antennas" filed on Sep. 17, 1998.

BACKGROUND OF THE INVENTION

1. Field of the Invention

The present invention is related to antenna systems and, more particularly, to a method and system for mitigating static mode multipath effects, such as errors in carrier phase, code, and signal noise.

2. Description of the Prior Art

The corrupting effect of multipath signals on carrier phase measurements, signal noise, and code data obtained with an antenna system is one of the limitations to achieving high accuracy positions in a wide variety of applications. The problem is especially a concern for GPS reference stations whereby the static environment may induce slowly changing specular effects which do not easily average out.

One conventional approach to mitigating the resulting errors is by modifying the antenna gain pattern, such as incorporating a choke ring with a ground plane, to produce a cutoff near the horizon and counter the presence of multipath signals. Another approach, which utilizes an antenna designed to have sharp cutoff below a certain elevation angle, is disclosed by C. Bartone and F. van Graas in *Proceedings of IEEE PLANS, Airport Pseudolites for Local Area Augmentation*, 1998, pp. 479–86.

However, even with antenna systems having sharp cutoffs below an elevation of 15°, multipath signals from tall structures would still pose a problem. Moreover, for GPS applications, such a cutoff reduces the available coverage of the antenna and compromises the operation of the GPS system. In the alternative, there are various methods to mitigate code multipath by using a multiple signal classification technique with multiple antennas and an extended multipath estimation delay lock loop, as disclosed by D. Moelker in *Proceedings of ION GPS-97*, 1997, *Multiple Antennas for Advanced GNSS Multipath Mitigation and Multipath Direction Finding*, pp. 541–50.

However, there still remains a need for an improved apparatus and method of mitigating multipath-induced errors in satellite signal reception, and it is an object of the present invention to provide such an apparatus and method.

SUMMARY OF THE INVENTION

An antenna system for mitigating static carrier-phase, signal noise, and code multipath effects includes a reference antenna and a plurality of closely-spaced secondary antennas for acquiring direct and reflected signal, each antenna connected to a respective receiver, where the receiver output data is used to estimate the parameters of a virtual reflector and compute corrective values.

BRIEF DESCRIPTION OF THE DRAWINGS

The invention description below refers to the accompanying drawings, of which.

DETAILED DESCRIPTION OF AN ILLUSTRATIVE EMBODIMENT

Background of the Invention

Figure 1:
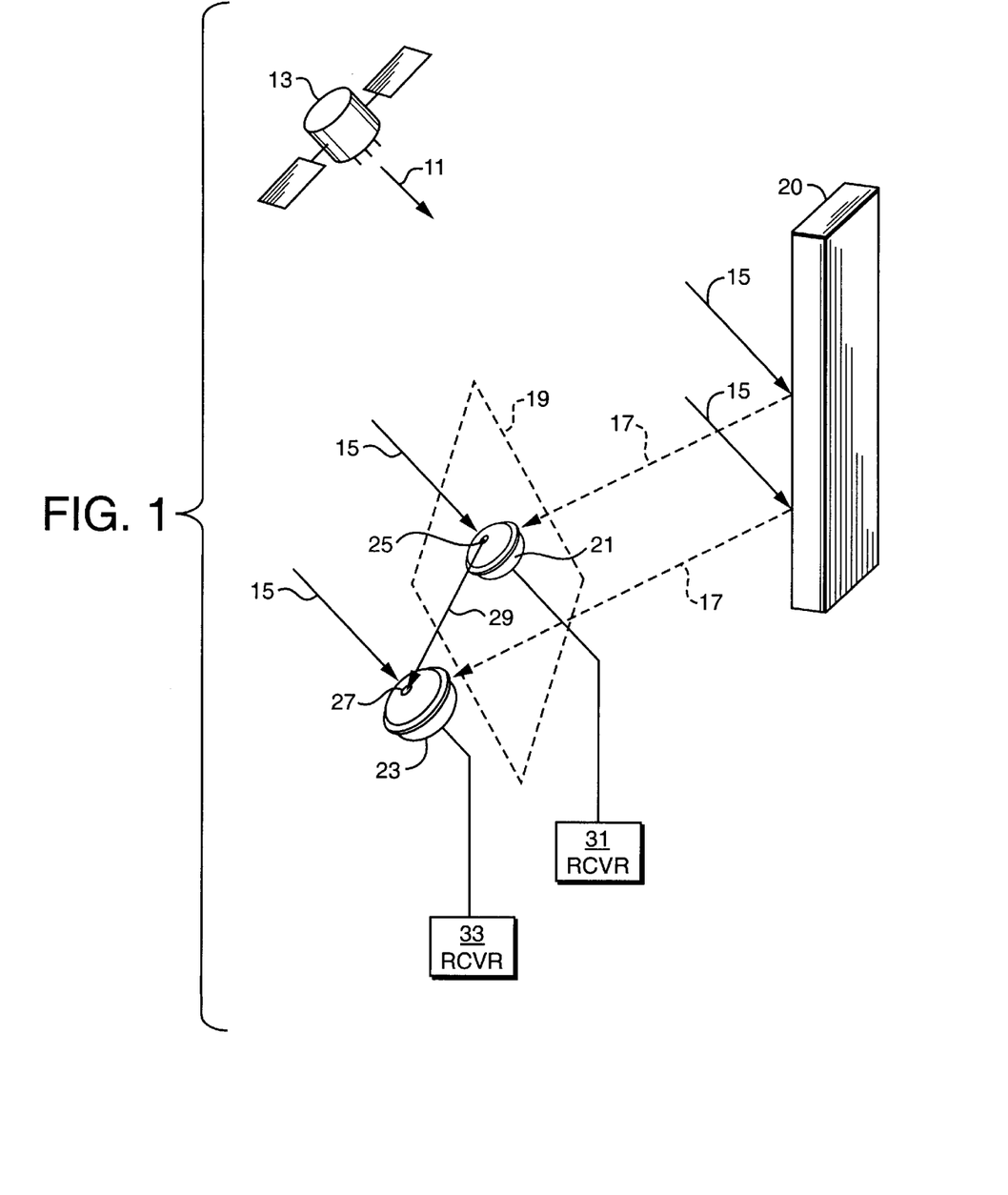
FIG. 1 is a diagram illustrating the geometry of direct and reflected rays incident on a reference antenna and a secondary antenna.

FIG, 1 illustrates the multipath effect on a direct signal 11 having a wavelength $\lambda$, such as that emitted by a GPS satellite 13. The direct signal 11 can be represented as a set of parallel direct rays 15 incident upon a reference antenna 21, a nearby secondary antenna 23, and a reflector 20, such as a nearby structure. Some of the direct rays 15 are reflected in the direction of the reference antenna 21 by the planar reflector 20 as a parallel reflected ray 17. In the reflected ray 17, a wavefront 19, perpendicular to the direction of propagation, will have the same phase for all the other parallel rays reflected from the reflector 20. Accordingly, the phase of the reflected signal 17 is determinable at both a reference phase center 25 in the reference antenna 21 and a secondary phase center 27 in the secondary antenna 23. The difference in range between antennas 23 and 21 is denoted by $\Delta r_{29}$, where the relative position of the secondary phase center 27 with respect to the reference phase center 25 is represented by a positional vector 29.

Preferably, the reference antenna 21 and the secondary antenna 23 are closely-spaced. By 'closely-spaced' is meant that the secondary antenna 23 is physically located in such close proximity to the reference antenna 21 that multipath signals acquired by the reference antenna 21 are highly correlated to the multipath signals acquired by the secondary antenna 23. This criterion can be achieved, for example, by locating the secondary phase center 27 within a wavelength $\lambda$ of the reference phase center 25. With correlated multipath signals, the relative phase of the reflected signal 17, with respect to the direct signal 15, can be readily computed at the secondary antenna 23 from the known geometry between the secondary antenna 23 and the reference antenna 21, and the direction of the reflected signal 17.

In equation (1) below, the relative phase of the reflected signal 17 at the secondary phase center 27, denoted by $\gamma_S$, is expressed as a function of: i) the relative phase of the reflected signal 17 at the reference phase center 25, denoted by $\gamma_R$; ii) the length of the positional vector 29, denoted by $r_{29}$; iii) the azimuth of the reflected signal 17, denoted by $\varphi_{17}$; iv) the azimuth of the positional vector 29, denoted by $\phi_{29}$; and v) the elevation of the reflected signal 17, denoted by $\theta_{17}$.

$$\gamma_S = \gamma_R + \frac{2\pi}{\lambda} r_{29} \cos(\varphi_{17} - \phi_{29}) \cos\theta_{17} - \frac{2\pi}{\lambda} \Delta r_{29} \qquad (1$$

In a typical application, a receiver 31 will input a plurality of n multipath signals via the reference antenna 21, in addition to the direct signal 15. For the case in which the reference antenna is receiving GPS signals, the resulting incoming signal s(t) can be expressed as, $$s(t) = d(t)c(t)A\sum_{i=0}^{n} \alpha_i \cos\left(2\pi f_L t + \frac{2\pi \delta_i}{\lambda} + \vartheta_0\right) \quad (2)$$

where, d(t) is the navigational data bit c(t) is the GPS C/A code

A is the carrier signal amplitude $\alpha_0$ is the direct signal coefficient $\alpha_i$ are the multipath signal coefficients, for $1 \leq i \leq n$ $f_L$ is the GPS carrier frequency $\delta_i$ are signal path delays of multipath signal 17 with respect to direct signal 15

$\lambda$ is the GPS signal wavelength, and $\vartheta_0$ is the initial phase angle.

Note that, for the direct signal (i.e., i=0), $\delta_0$=0 and $\alpha_0$=1.

In the receiver 31, the incoming signal s(t) is typically beat with the local carrier in Inphase and Quadraturephase loops after the delay lock loop (DLL). If the effect of the navigation data bits is ignored, the measured carrier phase Ψ of the discriminator output of the receiver 31 can be found from the expression, $$\Psi_R = \arctan\left(\frac{\sum_{i=0}^{n} R(\tau - \delta_i)\alpha_i \sin\left(\psi_R + \frac{2\pi \delta_i}{\lambda}\right)}{\sum_{i=0}^{n} R(\tau - \delta_i)\alpha_i \cos\left(\psi_R + \frac{2\pi \delta_i}{\lambda}\right)}\right) \quad (3)$$

where,

R(τ) is the correlation function, and $\Psi_R$ is the true carrier phase.

The following derivation incorporates the concept of a virtual reflector with time-varying parameters. The virtual reflector is taken to be the mathematical equivalent of the combined physical reflectors causing reflected signals to appear at the reference antenna 21 and the secondary antenna 23. In the derivation, these multipath signals are assumed to originate at this virtual reflector in which the reflection parameters are expressed as a function of time. Using equation (3), the carrier phase measurement error due to multipath effects, given by $\Delta\Psi_R = \Psi_R - \psi_R$, becomes, $$\Delta\Psi_R = \arctan\left(\frac{R(\tau)\sin\psi_R(t) + R(\tau-\delta(t))\alpha(t)\sin(\psi_R(t) + \gamma_R(t))}{R(\tau)\cos\psi_R(t) + R(\tau-\delta(t))\alpha(t)\cos(\psi_R(t) + \gamma_R(t))}\right) - \psi_R(t) \quad (4)$$

which can be simplified to, $$\Delta\Psi_R = \arctan\left(\frac{R(\tau-\delta(t))\alpha(t)\sin\gamma_R(t)}{R(t) + R(\tau-\delta(t))\alpha(t)\cos\gamma_R(t)}\right) \quad (5)$$

If we define a normalized reflection coefficient as, $$\hat{\alpha}(t) \equiv \frac{\alpha(t)R(\tau-\delta(t))}{R(\tau)} \quad (6)$$

the expression reduces to, $$\Delta\Psi_R = \arctan\left(\frac{\hat{\alpha}(t)\sin\gamma_R(t)}{1 + \hat{\alpha}(t)\cos\gamma_R(t)}\right) \quad (7a)$$

Similarly, the carrier phase measurement error found in the discriminator output of a secondary receiver 33 due to multipath effects, given by $\Delta\Psi_S = \Psi_S - \psi_S$, reduces to, $$\Delta\Psi_S = \arctan\left(\frac{\hat{\alpha}(t)\sin\gamma_S(t)}{1 + \hat{\alpha}(t)\cos\gamma_S(t)}\right) \quad (7b)$$

In a configuration comprising multiple closely-spaced antennas, the reflected signals incident on each antenna in the cluster will be highly correlated. By using the above model, it is possible to estimate the carrier phase error due to multipath signals. To insure that the reflected signals are correlated across the antennas, it is preferable that the closely-spaced antennas be mounted on a common, substantially rigid platform.

The difference in carrier phase error between the phase center R in a reference antenna and the phase center S in a secondary antenna, due to the presence of these reflected signals, can be given by, $$\Delta\Psi_R - \Delta\Psi_S = \quad (8)$$
$$\arctan\left(\frac{\hat{\alpha}(t)\sin\gamma_R(t) - \hat{\alpha}(t)\sin\gamma_S(t) + \hat{\alpha}^2(t)\sin(\gamma_R(t) - \gamma_S(t))}{1 + \hat{\alpha}(t)\cos\gamma_R(t) - \hat{\alpha}(t)\cos\gamma_S(t) + \hat{\alpha}^2(t)\cos(\gamma_R(t) - \gamma_S(t))}\right)$$

This model, which relates the measurement data and the state parameters to be estimated, is used to develop the multipath mitigation filter disclosed below.

Description of a Preferred Embodiment

Figure 2:
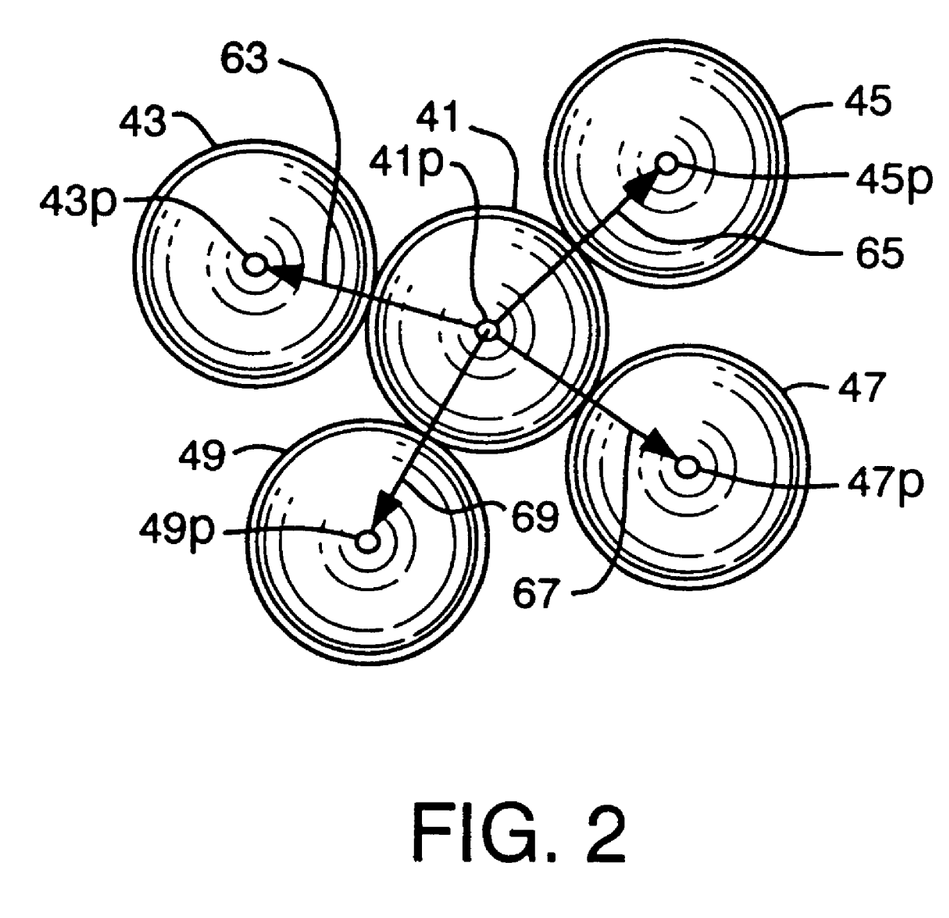
FIG. 2 is a plan view of an antenna array as used in the mitigation of static multipath effects.

FIG. 2 is a plan view of an antenna array 40 in accordance with the present invention, as used in the mitigation of static multipath effects. The antenna array 40 comprises a reference antenna 41 and four secondary antennas 43, 45, 47, and 49. The reference antenna 41 includes a reference phase center 41p, and each of the secondary antennas 43, 45, 47, and 49 includes a respective secondary phase center 43p, 45p, 47p, and 49p. The relative positions, with respect to the reference phase center 41p, of the secondary phase centers 43p–49p are given by positional vectors 63, 65, 67, and 69 respectively. The range differences between the reference antenna 41 and the secondary antennas 43, 45, 47, and 49 are denoted by $\Delta r_{63}$, $\Delta r_{65}$, $\Delta r_{67}$, and $\Delta r_{69}$, respectively. Preferably, the secondary antennas 43–49 are closely spaced to the reference antenna 41 such that each positional vector 63–69 is less than one wavelength X in length.

Figure 3:
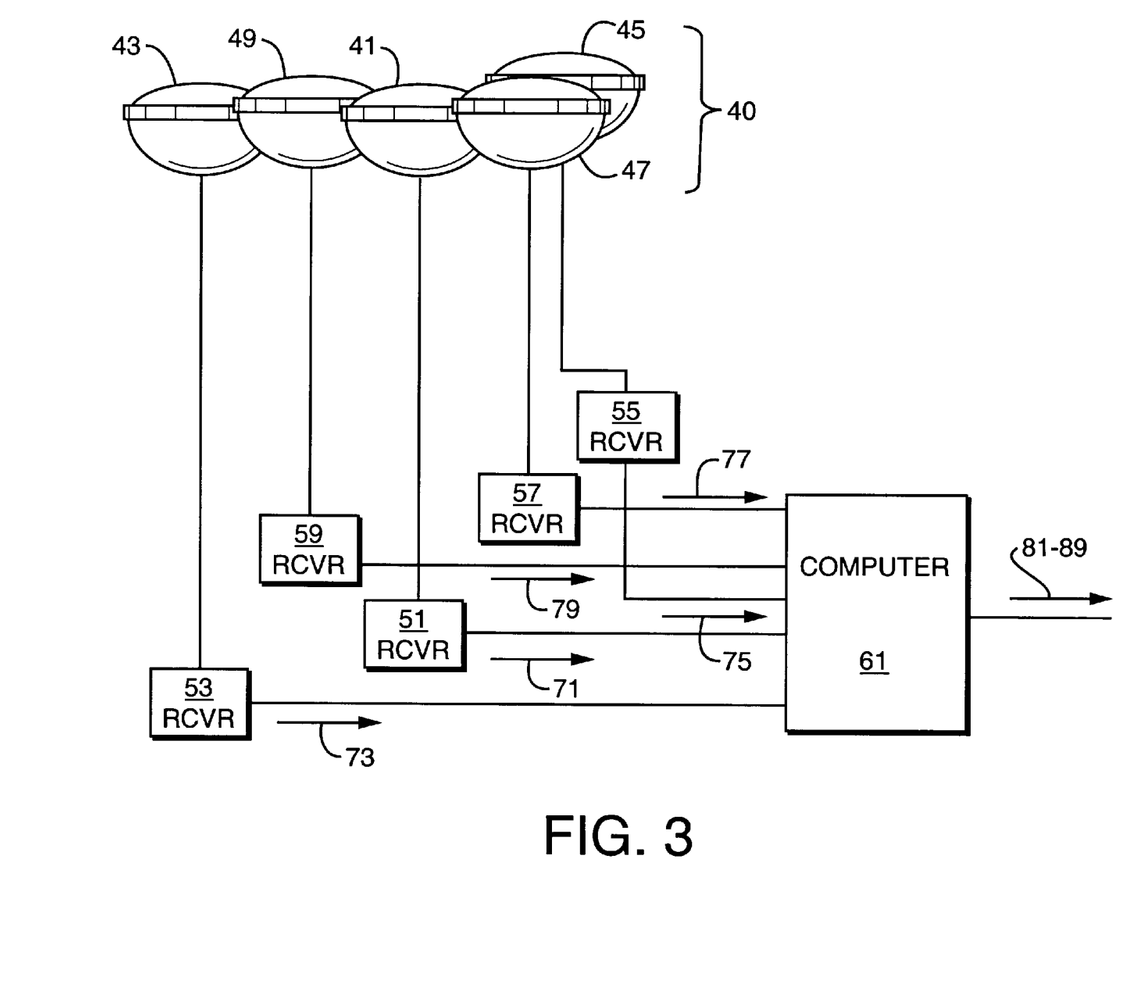
FIG. 3 is a diagrammatical elevation view of a system in accordance with the present invention showing the antenna array of FIG. 2 transmitting acquired signals to corresponding receivers, and discriminator output signals sent by the receivers to a computational device.

Each of the antennas 41–49 sends a respective composite signal, which includes the direct signal and one or more multipath signals, to a respective receiver 51 through 59, as shown in FIG. 3. Each of the receivers 51, 53, 55, 57, and 59 outputs a respective set of receiver data 71, 73, 75, 77, and 79. The receiver data 71–79 include measurements of signal strength, pseudorange (code), carrier phase, and satellite doppler. The receiver data 71–79 are transmitted to a computational device, such as a computer 61. The computer 61 produces corrective outputs 81–89 from the receiver data 71–79, as explained in greater detail below. In accordance with the present invention, mitigation of multipath can be achieved using any of signal strength data, code data, or carrier phase data to produce corrective outputs for errors in the signal strength, pseudorange, and carrier phase.

Derivation of Carrier Phase Error

In a first embodiment, each of the receivers 51 through 59 produces a discriminator output having a carrier phase error denoted as $\Delta\Psi_{51}$, through $\Delta\Psi_{59}$, respectively. By using equation (8) above, the difference in carrier phase error between the phase error output of the reference receiver 51 and the secondary receiver 53, for example, can then be expressed as:

$$\Delta\Psi_{51} - \Delta\Psi_{53} = \qquad (9a)$$
$$\arctan\left(\frac{\hat{\alpha}(t)\sin\gamma_{51}(t) - \hat{\alpha}(t)\sin\gamma_{53}(t) + \hat{\alpha}^2(t)\sin(\gamma_{51}(t) - \gamma_{53}(t))}{1 + \hat{\alpha}(t)\cos\gamma_{51}(t) - \hat{\alpha}(t)\cos\gamma_{53}(t) + \hat{\alpha}^2(t)\cos(\gamma_{51}(t) - \gamma_{53}(t))}\right)$$

where the parameters $\hat{\alpha}$, $\gamma_{51}$, and $\gamma_{53}$ are the unknown quantities.

Likewise, the differences in carrier phase error between the reference receiver 51 and the phase error outputs of the secondary receivers 55, 57, and 59 can be found from the respective equations:

$$\Delta\Psi_{51} - \Delta\Psi_{55} = \qquad (9b)$$
$$\arctan\left(\frac{\hat{\alpha}(t)\sin\gamma_{51}(t) - \hat{\alpha}(t)\sin\gamma_{55}(t) + \hat{\alpha}^2(t)\sin(\gamma_{51}(t) - \gamma_{55}(t))}{1 + \hat{\alpha}(t)\cos\gamma_{51}(t) - \hat{\alpha}(t)\cos\gamma_{55}(t) + \hat{\alpha}^2(t)\cos(\gamma_{51}(t) - \gamma_{55}(t))}\right)$$

in which the unknown parameters are $\hat{\alpha}$, $\gamma_{51}$ and $\gamma_{55}$;

$$\Delta\Psi_{51} - \Delta\Psi_{57} = \qquad (9c)$$
$$\arctan\left(\frac{\hat{\alpha}(t)\sin\gamma_{51}(t) - \hat{\alpha}(t)\sin\gamma_{57}(t) + \hat{\alpha}^2(t)\sin(\gamma_{51}(t) - \gamma_{57}(t))}{1 + \hat{\alpha}(t)\cos\gamma_{51}(t) - \hat{\alpha}(t)\cos\gamma_{57}(t) + \hat{\alpha}^2(t)\cos(\gamma_{51}(t) - \gamma_{57}(t))}\right)$$

where the parameters $\hat{\alpha}$, $\gamma_{51}$, and $\gamma_{57}$ are unknown, and $$\Delta\Psi_{51} - \Delta\Psi_{59} = \qquad (9d)$$
$$\arctan\left(\frac{\hat{\alpha}(t)\sin\gamma_{51}(t) - \hat{\alpha}(t)\sin\gamma_{59}(t) + \hat{\alpha}^2(t)\sin(\gamma_{51}(t) - \gamma_{59}(t))}{1 + \hat{\alpha}(t)\cos\gamma_{51}(t) - \hat{\alpha}(t)\cos\gamma_{59}(t) + \hat{\alpha}^2(t)\cos(\gamma_{51}(t) - \gamma_{59}(t))}\right)$$

in which the unknown parameters are $\hat{\alpha}$, $\gamma_{51}$, and $\gamma_{59}$;

The six unknown parameters in equations (9a) through (9d) can be reduced to four by means of equation (1), where $$\gamma_{53} = \gamma_{51} + \frac{2\pi}{\lambda}r_{63}\cos(\varphi_0 - \phi_{63})\cos\theta_0 - \frac{2\pi}{\lambda}\Delta r_{63} \qquad (10a)$$

$$\gamma_{55} = \gamma_{51} + \frac{2\pi}{\lambda}r_{65}\cos(\varphi_0 - \phi_{65})\cos\theta_0 - \frac{2\pi}{\lambda}\Delta r_{65} \qquad (10b)$$

$$\gamma_{57} = \gamma_{51} + \frac{2\pi}{\lambda}r_{67}\cos(\varphi_0 - \phi_{67})\cos\theta_0 - \frac{2\pi}{\lambda}\Delta r_{67} \qquad (10c)$$

$$\gamma_{59} = \gamma_{51} + \frac{2\pi}{\lambda}r_{69}\cos(\varphi_0 - \phi_{69})\cos\theta_0 - \frac{2\pi}{\lambda}\Delta r_{69} \qquad (10d)$$

When the expressions of equations (10a) through (10d) are used in equations (9a) through (9d), the following set of equations is produced:

$$\Delta\Psi_{51} - \Delta\Psi_{53} = f_{53}(\hat{\alpha}, \gamma_0, \theta_0, \phi_0) \qquad (11a)$$
$$\Delta\Psi_{51} - \Delta\Psi_{55} = f_{55}(\hat{\alpha}, \gamma_0, \theta_0, \phi_0) \qquad (11b)$$
$$\Delta\Psi_{51} - \Delta\Psi_{57} = f_{57}(\hat{\alpha}, \gamma_0, \theta_0, \phi_0) \qquad (11C)$$
$$\Delta\Psi_{51} - \Delta\Psi_{59} = f_{59}(\hat{\alpha}, \gamma_0, \theta_0, \phi_0) \qquad (11d)$$

These four equations, $f_{53}$ through $f_{59}$, can be solved simultaneously to obtain the values of the four unknown quantities $\hat{\alpha}$, $\gamma_0$, $\theta_0$, and $\phi_0$. This set of equations can be solved by various methods known in the relevant art, including using a Kalman Filter, a least-squares method, a wave estimator, and a Gauss-Jordan method.

The values obtained for $\hat{\alpha}$, $\gamma_0$, $\theta_0$, and $\phi_0$ are used in equations (7) and (10) to find the carrier phase errors, given by $$\Delta\Psi_{51} = \arctan\left(\frac{\hat{\alpha}(t)\sin\gamma_{51}(t)}{1 + \hat{\alpha}(t)\cos\gamma_{51}(t)}\right) \qquad (12a)$$

$$\Delta\Psi_{53} = \arctan\left(\frac{\hat{\alpha}(t)\sin\gamma_{53}(t)}{1 + \hat{\alpha}(t)\cos\gamma_{53}(t)}\right) \qquad (12b)$$

$$\Delta\Psi_{55} = \arctan\left(\frac{\hat{\alpha}(t)\sin\gamma_{55}(t)}{1 + \hat{\alpha}(t)\cos\gamma_{55}(t)}\right) \qquad (12c)$$

$$\Delta\Psi_{57} = \arctan\left(\frac{\hat{\alpha}(t)\sin\gamma_{57}(t)}{1 + \hat{\alpha}(t)\cos\gamma_{57}(t)}\right) \qquad (12d)$$

$$\Delta\Psi_{59} = \arctan\left(\frac{\hat{\alpha}(t)\sin\gamma_{59}(t)}{1 + \hat{\alpha}(t)\cos\gamma_{59}(t)}\right) \qquad (12e)$$

Note that $\gamma_{51}$ is a known quantity and that equation (12a) can be solved directly. The remaining four equations (12b) through (12e) are solved after the values for $\gamma_{53}(t)$, $\gamma_{55}(t)$, $\gamma_{57}(t)$, and $\gamma_{59}(t)$ have been derived using equations (10a) through (10d).

The resultant values for $\Delta\Psi_{51}$ through $\Delta\Psi_{59}$ are then used as corrections to the respective carrier phase measurements to produce corrected output data. With these corrected data, a reference station can be designated as: i) the reference antenna 41, or ii) one of the secondary antennas 43–49, or iii) an array of two or more of the reference antenna 41 and the secondary antennas 43–49.

Figure 4A:
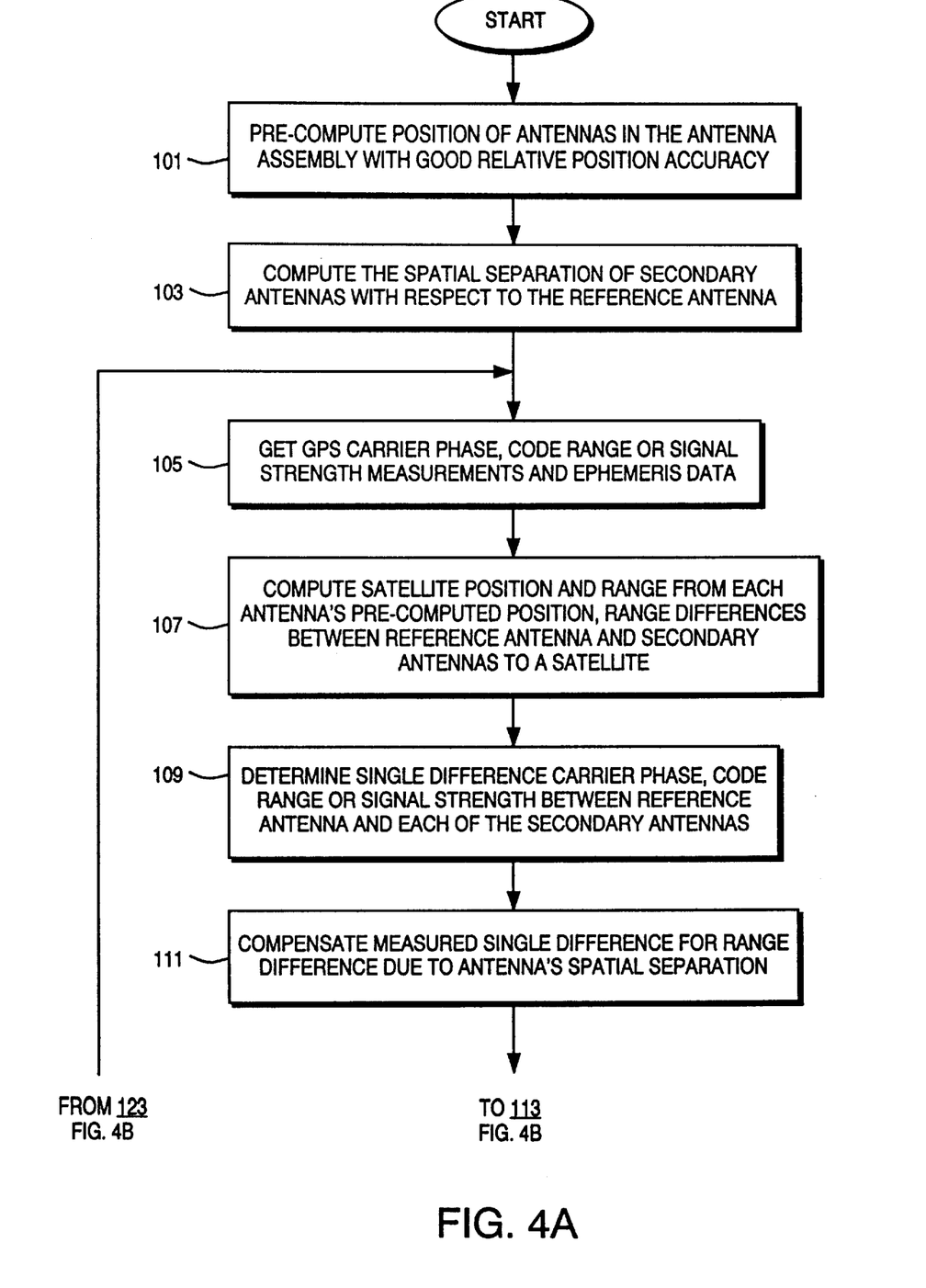
FIG. 4 is a flow diagram illustrating the sequence of operations performed by the system of FIG. 3.
Figure 4B:
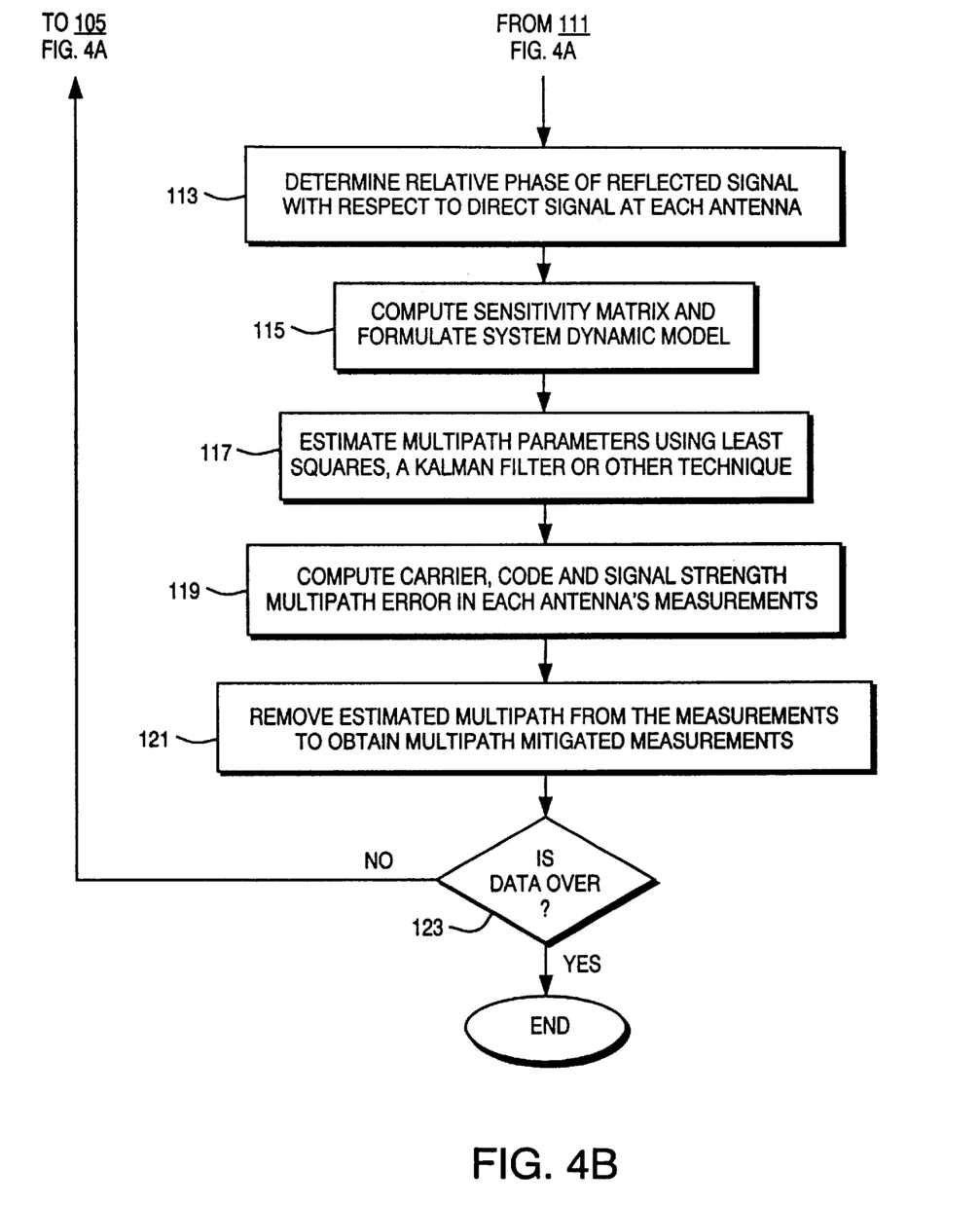

The above procedure can be further illustrated with reference to the flow diagram of FIG. 4. The coordinates of the reference antenna 51 and the secondary antennas 53–59 are determined, in step 101. These coordinates are then used to calculate the relative displacements of the secondary antennas 53–59 with respect to the reference antenna 51, in step 103. The GPS carrier phase, code range, or signal strength measurements are obtained along with ephemeris data, in step 105. Satellite position and range differences are computed, in step 107. The carrier phase differences, code range differences, or signal strength differences are found, in step 109, and compensation is made for the spatial separation of the antennas, in step 111. The relative phase of reflected signals are obtained with respect to the direct signal 15, in step 113. A design matrix is computed, (e.g., equation (15) below is used for carrier phase errors), in step 115. The multipath parameters are estimated using any applicable method, including, for example, a least-squares method, a Kalman filter, variants of the Kalman filter, a wave estimator and variants, or a Gauss-Jordan method, in step 117. The carrier phase errors, code range errors, and/or signal strength multipath errors are computed, in step 119. In step 121, these error values are used to remove, or to mitigate, estimated multipath errors from the measurements obtained in step 105. If data acquisition has ended, at step 123, the procedure is completed. Otherwise, the procedure loops back to step 105.

Estimation of Multipath Parameters

Multipath parameters may be estimated by using any of the estimation techniques known to one skilled in the relevant art. The multipath parameters may be estimated, for example, by using a least-squares method, a Kalman filter, variants of the Kalman filter, a wave estimator and variants, or a Gauss-Jordan method. The state vector for the estimator is given by, $$\begin{bmatrix} \hat{\alpha} \\ \gamma_0 \\ \theta_0 \\ \varphi_0 \end{bmatrix} = \begin{bmatrix} \text{normalized reflection coefficient} \\ \text{reflected signal relative phase at reference antenna} \\ \text{reflected signal elevation} \\ \text{reflected signal azimuth} \end{bmatrix} \quad (13)$$

The measurement vector for the estimator is given by, $$\begin{bmatrix} \Delta\Psi_{R,1} \\ \Delta\Psi_{R,2} \\ \vdots \\ \Delta\Psi_{R,m-1} \end{bmatrix} \quad (14)$$

where m is the number of antennas, and $\Delta\Psi_{R,i}$ is the phase difference between the reference antenna and a secondary antenna, where $1 \leq i \leq m-1$.

Note that $\Delta\Psi_{R,i} = \Delta\Psi_R - \Delta\Psi_i = f_R(\hat{\alpha}, \gamma_0, \theta_0, \varphi_0) - f_i(\hat{\alpha}, \gamma_0, \theta_0, \varphi_0)$ in accordance with equations (11a) and (11b).

The relationship between the state variables and the measurements can be obtained by computing the partial derivatives of equations (11a) through (11d) with respect to each of the state variables to obtain the design matrix, $$H = \begin{vmatrix} \frac{\partial(\Delta\Psi_{R,1})}{\partial\hat{\alpha}} & \frac{\partial(\Delta\Psi_{R,1})}{\partial\gamma_0} & \frac{\partial(\Delta\Psi_{R,1})}{\partial\theta_0} & \frac{\partial(\Delta\Psi_{R,1})}{\partial\varphi_0} \\ \frac{\partial(\Delta\Psi_{R,2})}{\partial\hat{\alpha}} & \frac{\partial(\Delta\Psi_{R,2})}{\partial\gamma_0} & \frac{\partial(\Delta\Psi_{R,2})}{\partial\theta_0} & \frac{\partial(\Delta\Psi_{R,2})}{\partial\varphi_0} \\ \vdots & \vdots & \vdots & \vdots \\ \frac{\partial(\Delta\Psi_{R,m-1})}{\partial\hat{\alpha}} & \frac{\partial(\Delta\Psi_{R,m-1})}{\partial\gamma_0} & \frac{\partial(\Delta\Psi_{R,m-1})}{\partial\theta_0} & \frac{\partial(\Delta\Psi_{R,m-1})}{\partial\varphi_0} \end{vmatrix} \quad (15)$$

Equations (13) through (15) are used to estimate the reflection parameters of the virtual reflector affecting the carrier phase measurement of a particular GPS satellite signal using one of the estimation techniques noted above. One such filter per GPS satellite is required to correct the carrier phase from each of the satellite signals in a corresponding receiver.

After the reflected signal relative phase at the reference antenna 41 is found, it is possible to compute the relative phase at all the other antennas by using the relationships given in equations (10a) though (10d). The reflected signal strength at all the antennas are assumed to be the same and are also estimated. After all the above mentioned parameters have been estimated, the carrier phase error due to the composite multipath signal can be computed using equations (12a) through (12e).

Derivation of Code Multipath Error

The corresponding code multipath errors and the signal strength errors can be derived in a manner similar to derivation of the carrier phase error disclosed above. In an application utilizing a dot-product, non-coherent discriminator-type Delay Lock Loop in a GPS receiver, for example, the code multipath error can be found from the derived expression $$\hat{\tau}_C = \frac{\alpha(t)T(1 - \alpha'(t))\cos\gamma(t)}{1 + \alpha'(t) + \alpha(t)\cos\gamma(t) + \alpha(t)\alpha'(t)\cos\gamma(t)} \quad (16)$$

where, $$\alpha' = \frac{R(\hat{\tau}_C - \delta(t))}{R(\hat{\tau}_C)} = \frac{1 - \left|\frac{\hat{\tau}_C - \delta(t)}{T}\right|}{1 - \left|\frac{\hat{\tau}_C}{T}\right|} \approx \frac{T - \delta(t)}{T} \quad (17)$$

and where, $\hat{\tau}_C$ is the code multipath error $\alpha(t)$ is the reflection coefficient T is the chip width $\gamma(t)$ is the relative phase of the reflected signal, and R is the correlation function.

Equation (16) above applies to code multipath errors, and corresponds to equation (7) above as applied to carrier phase errors. Similar expressions can be derived for other types of coherent and non-coherent discriminators. The single difference multipath error between a reference and a secondary antenna is given by, $$\hat{\tau}_R - \hat{\tau}_S = \frac{\alpha(t)T(\cos\gamma_R(t) - \alpha'(t)^2\cos\gamma_R(t) - \cos\gamma_S(t) + \alpha'(t)^2\cos\gamma_S(t))}{A + B + C + D + E + F + G + H} \quad (18)$$

where,

A=$1 + 2\alpha'(t) + \alpha'(t)^2\alpha(t)\cos\gamma_R(t) + \alpha(t)\cos\gamma_S(t)$
B=$2\alpha(t)\alpha'(t)\cos\gamma_R(t)$
C=$2\alpha(t)\alpha'(t)\cos\gamma_S(t)$
D=$\alpha(t)\alpha'(t)^2\cos\gamma_R(t)$
E=$\alpha(t)^2\cos\gamma_R(t)\cos\gamma_S(t)$
F=$\alpha(t)\alpha'(t)^2\cos\gamma_S(t)$
G=$2\alpha(t)^2\alpha'(t)\cos\gamma_R(t)\cos\gamma_S(t)$
H=$\alpha(t)^2\alpha'(t)^2\cos\gamma_R(t)\cos\gamma_S(t)$ Equation (18) above, which is applicable to code multipath error, corresponds to equation (8) above for the carrier phase error with the difference that an additional parameter, $\alpha'(t)$, is used in equation (18). The value for the parameter $\alpha'(t)$ can be estimated in the same manner as for other estimated values, described above. Alternatively, $\alpha'(t)$ can be held constant if desired.

Derivation of Signal Strength Error

Derivation of the signal strength errors makes use of the ratio of the antenna signal to noise ratios, given by $$\frac{SNR_S}{SNR_R} = \frac{1 + \hat{\alpha}(t)^2 + 2\hat{\alpha}(t)\cos\gamma_S(t)}{1 + \hat{\alpha}(t)^2 + 2\hat{\alpha}(t)\cos\gamma_R(t)} \quad (19)$$

where, $SNR_S$ is the signal-to-noise ratio in the reference antenna receiver $SNR_R$ is the signal-to-noise ratio in the secondary antenna receiver Equation (19) above is applicable to signal strength errors and corresponds to equation (8) above which is applicable to carrier phase errors.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. An apparatus for mitigating the effects of multipath signals on a direct signal having a wavelength λ, said apparatus comprising:

a reference antenna for acquiring the direct and multipath signals;

a reference receiver connected to said reference antenna, said reference receiver for receiving the acquired direct and multipath signals and for providing a set of reference output data corresponding to the direct and multipath signals acquired by said reference antenna;

a plurality of (m−1) secondary antennas disposed proximate said reference antenna, said secondary antennas for acquiring the direct and multipath signals;

a plurality of (m−1) secondary receivers, each said secondary receiver connected to a respective said secondary antenna, said secondary receivers for receiving the direct and multipath signals acquired by said respective secondary antennas and for providing respective sets of secondary output data corresponding to the direct and multipath signals acquired by said respective secondary antennas; and computational means for receiving said reference output data from said reference receiver and for receiving said (m−1) sets of secondary output data from said secondary receivers, said computational means comprising means for solving simultaneous equations for processing said reference output data and said (m−1) sets of secondary output data to produce a set of multipath parameters.

2. An apparatus as in claim 1 wherein said computational means comprises means for computing at least one corrective value from said multipath parameters, said at least one corrective value for mitigating the effect of the multipath signals on the direct signal.

3. An apparatus as in claim 1 wherein each said secondary antenna is closely spaced with said reference antennas.

4. An apparatus as in claim 1 wherein the phase center of each said secondary antenna is disposed within one wavelength $\lambda$ of the phase center of said reference antenna.

5. An apparatus as in claim 1 wherein said output data comprises at least one member of the group consisting of pseudorange data, carrier phase data, and signal strength data.

6. An apparatus as in claim 1 wherein said means for solving comprises means for executing at least one of the group consisting of a Kalman filter, a Gauss-Jordan approximation, a wave estimator, and a least-squares approximation.

7. An apparatus as in claim 1 wherein m has a value greater than or equal to five.

8. An apparatus as in claim 1 wherein said at least one said corrective value comprises at least one member of the group consisting of pseudorange error, carrier phase error, and signal strength error.

9. An apparatus as in claim 1 further comprising means for applying at least one said corrective value to at least one of said output data sets to provide at least one set of corrected output data.

10. A method for mitigating the effects of multipath signals on a direct signal, said method comprising the steps of:

acquiring a plurality of m sets of the direct and multipath signals using a reference antenna with a reference receiver and (m−1) secondary antennas with respective secondary receivers;

outputting a reference discriminator output signal from said reference receiver;

outputting a plurality of (m−1) secondary discriminator output signals from said secondary receivers;

providing said reference discriminator output to a computational device;

providing said m−1 secondary discriminator output signals to said computational device;

formulating a set of simultaneous equations from said plurality of m discriminator output signals; and deriving at least one corrective value by solving said set of simultaneous equations, said at least one corrective value for mitigating the effect of the multipath signals on the direct signal.

11. The method as in claim 10 further comprising the step of applying said at least one corrective parameter to at least one of said discriminator output signals to produce at least one corrected output signal.

12. The method as in claim 10 wherein at least one said discriminator output comprises at least one parameter from the group consisting of signal strength data, pseudorange data, and carrier phase data.

13. The method as in claim 10 wherein each said secondary antenna is closely spaced with said reference antenna.

14. The method as in claim 10 wherein the phase center of each said secondary antenna is disposed within one wavelength $\lambda$ of the phase center of said reference antenna.

15. The method as in claim 10 wherein said simultaneous equations comprise at least one virtual reflector parameter, said at least one virtual reflector parameter obtained by describing the multipath signals as a single signal reflected from a virtual reflector.

16. The method as in claim 10 wherein said step of solving simultaneous equations comprises a step of applying a Kalman filter.

17. The method as in claim 10 wherein said step of solving simultaneous equations comprises a step of applying a least-squares approximation.

18. The method as in claim 10 wherein said step of solving simultaneous equations comprises a step of applying a Gauss-Jordan approximation.

19. The method as in claim 10 wherein said step of solving simultaneous equations comprises a step of applying a wave estimator.

* * * * *

UNITED STATES PATENT AND TRADEMARK OFFICE
CERTIFICATE OF CORRECTION

PATENT NO. : 6,188,357 B1
DATED : February 13, 2001
INVENTOR(S) : Jayanta K. Ray et al.

Page 1 of 1

It is certified that error appears in the above-identified patent and that said Letters Patent is hereby corrected as shown below:

Title page,
Item [73], Assignee, should read as follows:

-- [73] Assignee: University Technologies, Inc., Calgary (CA) --.

Signed and Sealed this

Nineteenth Day of February, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.    : 6,188,357 B1                                                     Page 1 of 1
DATED         : February 13, 2001
INVENTOR(S)   : Jayanta K. Ray et al.

It is certified that error appears in the above-identified patent and that said Letters Patent is hereby corrected as shown below:

<u>Title page,</u>
Item [73], Assignee, should read as follows:

-- University Technologies International, Inc., Calgary (CA) --.

This certificate supersedes Certificate of Correction issued on February 19, 2002.

Signed and Sealed this

Thirteenth Day of August, 2002

*Attest:*

JAMES E. ROGAN
*Attesting Officer*    *Director of the United States Patent and Trademark Office*